US 9,406,020 B2

(12) United States Patent
Arroyo et al.

(10) Patent No.: US 9,406,020 B2
(45) Date of Patent: Aug. 2, 2016

(54) SYSTEM AND METHOD FOR NATURAL LANGUAGE QUERYING

(71) Applicant: Taiger Spain SL, Madrid (ES)

(72) Inventors: Sinuhé Arroyo, Segovia (ES); José Manuel López Cobo, Segovia (ES); Guillermo Alvaro Rey, Segovia (ES); Silvestre Losada Alonso, Segovia (ES)

(73) Assignee: Taiger Spain SL, Madrid (ES)

( * ) Notice: Subject to any disclaimer, the term of this patent is extended or adjusted under 35 U.S.C. 154(b) by 377 days.

(21) Appl. No.: 13/855,324

(22) Filed: Apr. 2, 2013

(65) Prior Publication Data

US 2013/0262361 A1 Oct. 3, 2013

Related U.S. Application Data

(60) Provisional application No. 61/619,371, filed on Apr. 2, 2012.

(51) Int. Cl.
*G06N 5/02* (2006.01)
*G06F 17/30* (2006.01)
*G06F 17/27* (2006.01)

(52) U.S. Cl.
CPC ............ *G06N 5/02* (2013.01); *G06F 17/30424* (2013.01); *G06F 17/30684* (2013.01); *G06F 17/278* (2013.01)

(58) Field of Classification Search
None
See application file for complete search history.

(56) References Cited

U.S. PATENT DOCUMENTS

| 8,463,810 B1* | 6/2013 | Rennison .................. 707/771 |
| 2002/0152202 A1* | 10/2002 | Perro et al. .................. 707/3 |
| 2009/0077075 A1* | 3/2009 | Bent et al. .................. 707/6 |
| 2010/0036788 A1* | 2/2010 | Wu .................. G06F 17/30286 706/47 |
| 2010/0185700 A1* | 7/2010 | Bodain ............. G06F 17/30734 707/803 |
| 2011/0161070 A1* | 6/2011 | Chen et al. .................. 704/9 |
| 2012/0197631 A1* | 8/2012 | Ramani et al. .................. 704/9 |

* cited by examiner

*Primary Examiner* — Mariela Reyes
*Assistant Examiner* — Soheila Davanlou
(74) *Attorney, Agent, or Firm* — Quarles & Brady LLP

(57) ABSTRACT

A system and method for information retrieval are presented. A natural language query is received from a client computer. The natural language query is analyzed to identify a plurality of terms, and a relationship between a pair of terms in the plurality of terms is determined using a knowledge model. The knowledge model defines a plurality of entities and inter-relationships between one or more of the plurality of entities for a knowledge domain. A triple statement is constructed using the relationship between the pair of terms, and a query is executed against a knowledge base using the triple statement to generate a set of results. The knowledge base identifies a plurality of items, each of the plurality of items is associated with at least one annotation identifying at one of the entities in the knowledge model. The set of results are transmitted to the client computer.

12 Claims, 13 Drawing Sheets

| C | C' | Dist. | Paths |
|---|---|---|---|
| C1 | C2 | 1 | C1-r-C2 |
| C1 | C3 | 2 | C1-r-C2-r-C3<br>C1-r-C5-r-C3 |
| ... | ... | ... | ... |
|  |  |  |  |
|  |  |  |  |
| C4 | C9 | 4 | ... |

Fig. 4

SYSTEM AND METHOD FOR NATURAL LANGUAGE QUERYING

CROSS-REFERENCE TO RELATED APPLICATIONS

This application claims priority to U.S. Provisional Patent Application 61/619,371 filed Apr. 2, 2012 and entitled "Ontology-Based Natural Language Querying."

FIELD OF THE INVENTION

The disclosure relates in general to an electronic system for querying a database and, more particularly, to a method and apparatus for enabling a user to query a database using a natural language query.

BACKGROUND

Different approaches have been taken with respect to information retrieval and search techniques within large database repositories. Typically, the process of information retrieval is triggered by a query entered by a user. Queries, in this context, formally capture the user's information needs, and are aimed at retrieving a set of results that match the query, ordered by relevancy. In most cases, the user input is a string of natural language text, enabling the execution of keyword queries of a database to retrieve a listing of items from the database that are indexed with the same keywords in the repository.

Two important information retrieval systems performance measures are "precision" and "recall". Given a particular query, a set of items in the repository, and an a priori knowledge of document relevancy so that each item is known to be either relevant or non-relevant for a given query, "precision" measures the ratio between the number of relevant items included in the set of query results and the total number of the set of results, while "recall" measures the ratio between the number of relevant items in the set of results and the total number of relevant items in the repository.

Generally, there is a trade-off between recall and precision, so that if precision is increased, recall will be poor, and in turn, if recall is increased, precision will be poor. For keyword-based systems, many systems do not reach 40% for both measures, given that ambiguous words in the query of a queried database might produce erroneous results and that different ways of referring to the items in the database might cause relevant documents not to appear in the results.

BRIEF SUMMARY

The disclosure relates in general to an electronic system for querying a database and, more particularly, to a method and apparatus for enabling a user to query a database using a natural language query.

In one implementation, the present invention is an information retrieval system. The system includes a knowledge model database configured to store a knowledge model for a knowledge domain. The knowledge model defines a plurality of entities and interrelationships between one or more of the plurality of entities. The system includes a knowledge base identifying a plurality of items. Each of the plurality of items is associated with at least one annotation identifying at one of the entities in the knowledge model. The system includes a query processing server configured to receive, from a client computer, a natural language query using a computer network, analyze the natural language query to identify a plurality of terms, and determine a relationship between a pair of terms in the plurality of terms using the knowledge model. The query processing server is configured to construct a triple statement using the relationship between the pair of terms, execute a query against the knowledge base using the triple statement to generate a set of results, and transmit, to the client computer, the set of results.

In another implementation, the present invention is a method for information retrieval system. The method includes receiving, from a client computer, a natural language query using a computer network, analyzing the natural language query to identify a plurality of terms, and determining a relationship between a pair of terms in the plurality of terms using a knowledge model. The knowledge model defines a plurality of entities and interrelationships between one or more of the plurality of entities for a knowledge domain. The method includes constructing a triple statement using the relationship between the pair of terms, and executing a query against a knowledge base using the triple statement to generate a set of results. The knowledge base identifies a plurality of items. Each of the plurality of items is associated with at least one annotation identifying at one of the entities in the knowledge model. The method includes transmitting, to the client computer, the set of results.

In another implementation, the present invention is a non-transitory computer-readable medium containing instructions that, when executed by a processor, cause the processor to perform the steps of receiving, from a client computer, a natural language query using a computer network, analyzing the natural language query to identify a plurality of terms, and determining a relationship between a pair of terms in the plurality of terms using a knowledge model. The knowledge model defines a plurality of entities and interrelationships between one or more of the plurality of entities for a knowledge domain. The instructions, when executed by a processor, cause the processor to perform the steps of constructing a triple statement using the relationship between the pair of terms, and executing a query against a knowledge base using the triple statement to generate a set of results. The knowledge base identifies a plurality of items. Each of the plurality of items is associated with at least one annotation identifying at one of the entities in the knowledge model. The instructions, when executed by a processor, cause the processor to perform the step of transmitting, to the client computer, the set of results.

BRIEF DESCRIPTION OF THE DRAWINGS

FIG. 4 shows a table in the relationships between the concepts of FIG. 3 are depicted in a tabular form.

DETAILED DESCRIPTION OF THE DRAWINGS

Figure 1:
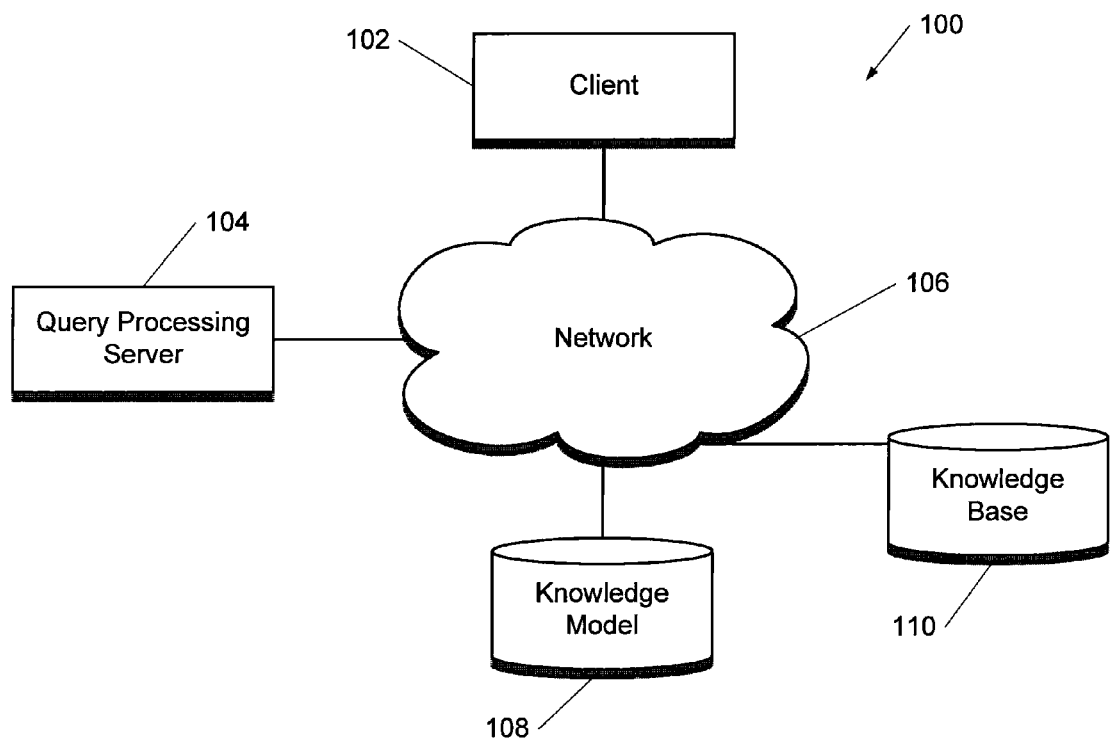
FIG. 1 is a block diagram illustrating one example configuration of the functional components of the present information retrieval system.

The disclosure relates in general to an electronic system for querying a database and, more particularly, to a method and apparatus for enabling a user to query a database using a natural language query.

This invention is described in embodiments in the following description with reference to the FIGS., in which like numbers represent the same or similar elements. Reference throughout this specification to "one embodiment," "an embodiment," "one implementation," "an implementation," or similar language means that a particular feature, structure, or characteristic described in connection with the embodiment is included in at least one embodiment of the present invention. Thus, appearances of the phrases "in one implementation," "in an implementation," and similar language throughout this specification may, but do not necessarily, all refer to the same embodiment.

The described features, structures, or characteristics of the invention may be combined in any suitable manner in one or more implementations. In the following description, numerous specific details are recited to provide a thorough understanding of implementations of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Any schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present system and method enable a user to provide a query input that consists of a natural language query. That natural language query is then transformed into a structured query configured to be executed against and extract the desired results from a knowledge base. The system and method generally extracts relevant (or potentially relevant) terms from the natural language query using Named Entity Recognition (NER) and Relationship Extraction techniques. Once the terms have been extracted, the terms are combined in pairs to generate a set of assertions (triples) that follow the ontological schema of a knowledge model. The set of assertions can then be used to query the knowledge base.

For a given subject matter, the present system provides both a knowledge model and a knowledge base. The knowledge model includes an ontology that defines concepts, entities, and interrelationships thereof for a given subject matter or knowledge domain. The knowledge model, therefore, normalizes the relevant terminology for a given subject matter domain.

The knowledge model may be composed of different ontological components that define the knowledge domain: The components can include concepts, instances, and relationships. Concepts (Classes), which are abstract objects of a given domain (in the present disclosure the knowledge domain of "sports" may be used for a number of non-limiting examples) such as categories or types; an example of a concept would be "basketball player", "team" or "three-point field goal"; Instances (Individual objects), which are concrete objects, for example a given player such as "Pau Gasol" or a team like "Los Angeles Lakers"; Relationships (relations), specify how objects in the knowledge model relate to other objects, for example the relationship "plays for" links the concept "basketball player" with the concept "team", and also may link the concrete instance "Pau Gasol" with the instance "Los Angeles Lakers". In some cases, two terms may be directly connected through more than one relationship; for example, the concept "basketball player" and the concept "team" may also be related through the "plays against" relationship. The Terms of the knowledge model include concepts, instances and relationships of a given domain to be used within a specific application are usually modeled by hand by ontology engineers. Such modeling is a process where arbitrary decisions need to be taken, and even though there are standard vocabularies and ontologies, the same domain may be modeled in different ways.

The knowledge base, in contrast, is the store of information that the information retrieval system is configured to search. The knowledge base is a database including many items (or references to many items) where the items can include many different types of content (e.g., documents, data, multimedia, and the like) that a user may wish to search. The content of the knowledge base can be stored in any suitable database configured to store the contents of the items and enable retrieval of the same.

To facilitate searching, the items in the knowledge base can each be associated with different concepts or entities contained within the knowledge base. This association can be made explicitly (e.g., through the use of metadata associated with the content), or implicitly by the item's contents. With the items in the knowledge base catalogued using information described in the knowledge model, the knowledge model becomes an index or table of contents by which to navigate the contents of the knowledge base.

As used in the present disclosure, Named Entity Recognition (NER) (also referred to as "entity identification" or "entity extraction") is a form of Information Extraction (IE) that aims at locating, within unstructured text, atomic elements that belong to a predefined set of categories, such as the names of persons, organizations, locations, etc. In keeping with present example of the sports knowledge domain, if NER is performed on a sentence such as "Pau Gasol scored 20 points in the LAL game", at least the named entities for "Pau Gasol" and "Los Angeles Lakers" (derived from the acronym LAL) would be identified.

Approaches for NER include the use of linguistic grammar-based techniques and statistical models. In the present disclosure, however, NER is dependent on the underlying ontology knowledge model (in this case relating to sports). As such, the example named terms identified in the sentence would be identified as a result of their being included in the relevant knowledge model. In this example, the knowledge model would include the synonym "LAL" for "Los Angeles Lakers", in order for the NER process to identify the correct term, for in that particular case, even though the name is different, because of the use of synonyms in the knowledge model, the entity "Los Angeles Lakers" could be properly identified. In some cases, different terms might be recognized for a string of text; in these cases, syntactic analysis of the string, and in particular part-of-speech (POS) tagging, can help disambiguate the terms and properly identify the relevant one.

Relationship Extraction is another subtask of IE, similar to NER, but where the objective is not to locate and classify the terms within unstructured text, but the semantic relationships among them. In this case, it is mostly the verbs, which are able to relate nouns, that is the part of the sentence identified by the technique. For example, in the sentence "Pau Gasol playing for the Lakers", the relationship "plays for" would be identified by this task. Note that in this case, through lemmatization techniques, i.e., by grouping together the different inflected forms of a word (e.g., "playing", "plays", "played") so they are considered as a single term, it is also possible to identify the relationships even in different tense form.

Accordingly, NER is a technique that can be used to identify terms in a natural language that may be instances or concepts within the knowledge model. Similarly, relationship extraction is a technique that can be used to identify terms in a natural language query that may be relationships within the knowledge model.

FIG. 1 is a block diagram illustrating one example configuration of the functional components of the present information retrieval system 100. System 100 includes client 102. Client 102 includes a computer executing software configured to interact with query generation and processing server 104 via communications network 106. Client 102 can include a conventional desktop computer or portable devices, such as laptops computers, smart phones, tablets, and the like. A user uses client 102 to submit a query (e.g., a natural language query) and then view the results of that query after execution of the query against a particular knowledge base.

Query generation and processing server 104 is configured to interact with client 102 to perform a query. In one implementation, the query is a natural language query, where a user supplies the natural language query terms using client 102. Query processing server 104 receives the natural language query, performs NER and Relationship Extraction on the natural language query to identify terms associated with the query that appear in a relevant knowledge model. Query processing server 104 then uses the terms identified in the natural language query in combination with the knowledge model to construct structured queries. The structured queries are used to query a knowledge base to generate a listing of items in the knowledge base that satisfy the query requirements.

To perform these tasks, query generation and processing server 104 accesses knowledge model database 108, which contains the knowledge model (i.e., the concepts, instances and relationships that define the subject matter domain). Once a query has been created, query generation and processing server 104 executes the query against knowledge base database 110, which stores the knowledge base and any metadata or annotations describing the items of the knowledge base. In knowledge base database 110, the items to be retrieved are generally annotated with one or more of the terms available in the knowledge model.

A knowledge model may be constructed by hand, where engineers (referred to as ontology engineers) lay out the model's concepts, instances and relationships and the relationships thereof. This modeling is a process where domain-specific decisions need to be taken, and even though there exist standard vocabularies and ontologies, it is worth noting the same domain may be modeled in different ways, and that such knowledge models may evolve over time. Sometimes the knowledge model is used as a base and the model's individual components are considered static, but the present system may also be implemented in conjunction with dynamic systems where the knowledge model varies over time.

One possible implementation of the knowledge model, considering the particular example of semantic (ontological) systems could be a "triplestore"—a repository (database) purpose-built for the storage and retrieval of semantic data in the form of "triples" (or "statements" or "assertions"). The concept of "triple" in this sense is to be understood in a broad sense as a data entity that follows a subject-predicate-object (s,p,o) pattern (e.g., subject→predicate→object). Generally, subject and object of a triple store include concepts or instances from the knowledge model, while the predicate is a relationship from the knowledge model, although similar data models may be used. An example of such a triple is ("Pau Gasol", "plays for", "Los Angeles Lakers"). As a possibility in this respect, a semantic data model widely extended for expressing these statements is the Resource Description Framework (RDF). Query languages like SPARQL are one possibility for retrieving and manipulating RDF data stored in triplestores, although other mechanisms are also possible.

The knowledge model thus contains the relationships amongst the different types of resources in the application domain. The knowledge model contains both the (ontological) schema of abstract concepts and their relations (see, for example, the knowledge model graph shown in FIG. 3) such as ("basketball player", "plays for", "team"), as well as instances with their respective general "static" assertions valid for the whole domain, such as concrete "basketball players" like "Pau Gasol" or "Kobe Bryant", and their relationship to the teams they play for, etc. These concrete instances are used for the NER and Relationship extraction, described below. As explained above, the ontology-engineering task by which the model is configured is a manual process, though it might count on semi-automatic support by previously identifying the kind of concepts and instances that will be relevant for the domain.

The knowledge base is the repository that contains the items or content that the user wishes to search and retrieve. The knowledge base may store many items including many different types of digital data. The knowledge base, for example, may store plain text documents, marked up text, multimedia, such as video, images and audio, programs or executable files, raw data files, etc. The items can be annotated with both particular instances (e.g., "Pau Gasol") and concrete assertions ("Pau Gasol", "plays for", "Spanish national team") selected from the knowledge model, which are particularly relevant for the given item. One possible implementation of the knowledge base is a Document Management System that permits the retrieval of documents via an index of the entities of the knowledge base. To that end, documents in the repository need to be associated to (or "annotated with") those entities.

The techniques described herein can be applied to repositories of documents in which annotations have been performed through different manners. The process of annotation for the documents may have been performed both manually, with users associating particular concepts and instances in the documents to particular entities in the knowledge model, and/or automatically, by detecting which references to entities appear in each knowledge base item. Systems may provide support for manual annotations by facilitating the user finding and selecting entities from the knowledge model, so these can be associated to items in the knowledge base. For example, in a possible embodiment, the system may offer auto-complete functionality so when the user begins writing a portion of a word, the system might suggest a potential completion for the word. The user may decide then to annotate a given item with the chosen instance, i.e., to specify that the entity from the knowledge model is associated to the particular item in the knowledge base.

When automatically creating metadata for the knowledge base items, techniques like text parsing and speech-to-text over the audio track or a multimedia item can be used along with image processing for videos. In this manner, it is possible to associate each of the items in the knowledge base (or even portions of the items), with the entities (e.g., concepts, instances, and relationships) in the knowledge model. This process is dependent on the knowledge model because the identification of entities in the knowledge base item is performed in reliance upon the knowledge model. For example, the visual output of certain documents (e.g., images or video) can be analyzed using optical character recognition techniques to identify words or phrases that appear to be particularly relevant to the document. These words or phrases may be those that appear often or certain words or phrases that may appear in a corresponding knowledge base. For example, when operating in the sports knowledge domain, when a document includes words or phrases that match particular concepts, instances, relationships, or entities within the knowledge domain (e.g., the document includes the words "football", "Pele", and "World Cup") the document can be annotated using those terms. For documents containing audio, the audio output can be analyzed using speech to text recognition techniques to identify words or phrases that appear to be particularly relevant to the document. These words or phrases may be those that are articulated often or certain words or phrases that may appear in a corresponding knowledge base. For example, when operating in the sports knowledge domain, when a document includes people discussing particular concepts, instances, relationships, or entities within the knowledge domain the document can be annotated using those terms.

Additionally, a combination of approaches (semi-automatic techniques) is also possible for annotating the knowledge base. The result of such annotation techniques is that the documents in the knowledge base repository are then indexed with metadata according to the entities (knowledge model concepts and/or instances) that appear in or have been associated to the items.

In the case of manual annotation, terms that belong to the knowledge model are associated with the items in the knowledge base. Different techniques for encouraging users to participate in the manual annotation of content may be applied, like the use of Games with a Purpose to leverage the user's interactions while they play. Again, the underlying knowledge model and the model's design define the kinds of annotations that can be applied to the items in the knowledge base.

Figure 2:
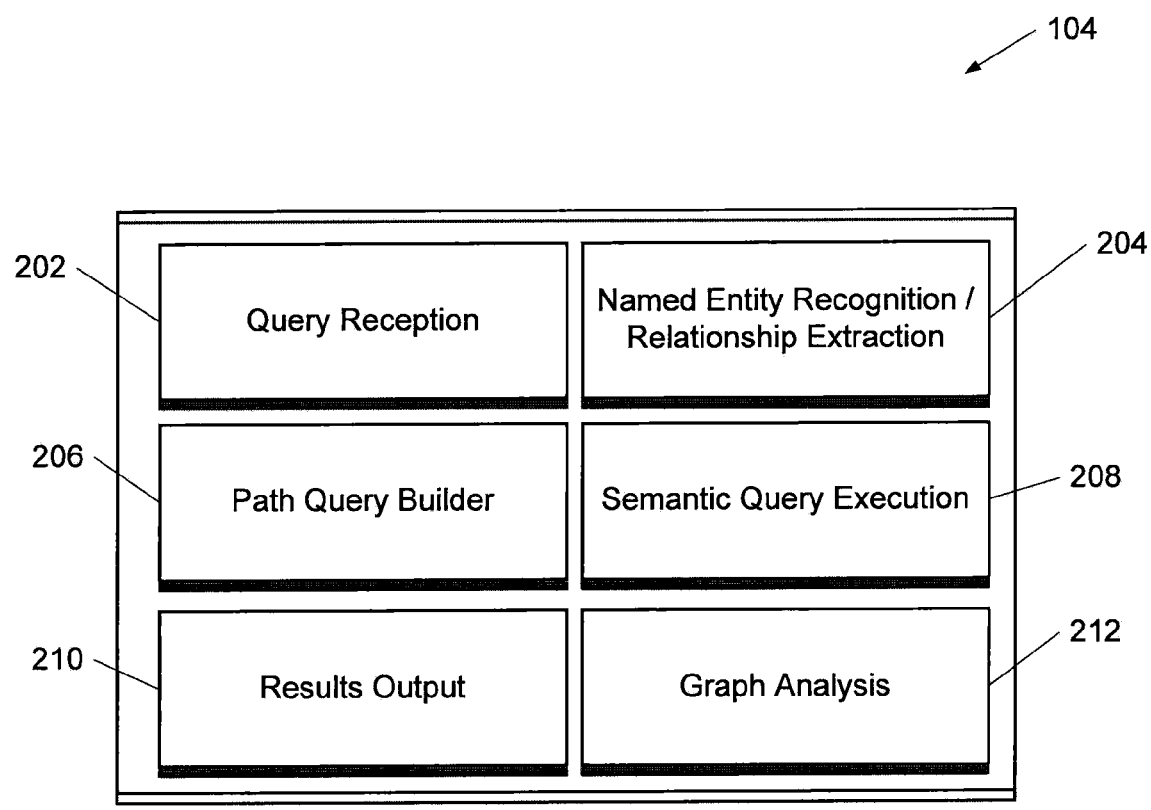
FIG. 2 is a block diagram showing functional components of a query generation and processing system.

FIG. 2 is a block diagram showing the functional components of query generation and processing server 104. Query generation and processing server 104 includes a number of modules configured to provide one or more functions associated with the present information retrieval system. Each module may be executed by the same device (e.g., computer or computer server), or may be distributed across a number of devices.

Query reception module 202 is configured to receive a natural language query targeted at a particular knowledge base. The query may be received, for example, from client 102 of FIG. 1. In various other implementations of query generation and processing server 104, though, other types of queries may be received and processed, such as natural language query, keyword queries, and the like.

NER and relationship extraction module 204 is configured to analyze the natural language query received by query reception module 202 to identify relevant terms (e.g., words in the query that are also concepts, instances or relationships in the Domain Knowledge) identified therein, as further discussed below.

Path query builder module 206 is configured to analyze the terms identified by NER and relationship extraction module 204 and combine one or more pairs of the terms to generate a set of statements (triples) that describe the query in a structured manner, as further described below.

Semantic query execution module 208 is configured to take the structured query generated by path query builder module 206 and execute the query against the desired knowledge base.

Results output module 210 is configured retrieve the items (or links thereto) that are relevant to an executed query (performed by semantic query execution module 208) executed against the knowledge base and provide an appropriate output to the user via client 102. In addition to the items themselves, results output module 210 may be configured to generate statistics or metrics associated with the resulting items and depict that data to the user. Results output module 210 may also depict a graph showing the relevant knowledge model entities that are present in the search results.

Graph analysis module 212 is a process that is routinely executed by query generation and processing server 104 to calculate the relationship and distance amongst the terms of a particular knowledge model.

In the present disclosure a graph can be a node-based depiction of a number of entities from a particular knowledge model that depicts both the entities and their interrelationships. An example knowledge model graph may set out, in a two-dimensional space, a number of concepts and/or instances contained within the knowledge model. The entities of the knowledge model can then interrelated by a number of visual indicators (e.g., a solid line, dashed line, or colored line) that indicates the type of relationship that two or more of the entities may have. Each node of the graph, therefore, can indicate an instance or concept selected from the knowledge model. In this disclosure the "graph structure" is to be understood in a broad sense as a visual representation of a set of entities that may each be interrelated through formal relationships.

In the present system, the execution of a search against a knowledge base uses the analysis performed by graph analysis module 212. As part of the graph analysis, the relationships between every two different instances or concepts in the knowledge model are calculated, and the distance and the shortest path amongst every pair can be stored. However, embodiments may consider the storage of further data beyond the shortest path, e.g., alternative paths. The outcomes of this step are used later on to build graph queries that follow the schema. In other implementations, rather than store this information in the form of a graph, the data may be stored in a lookup table, or some other data store.

Figure 3:
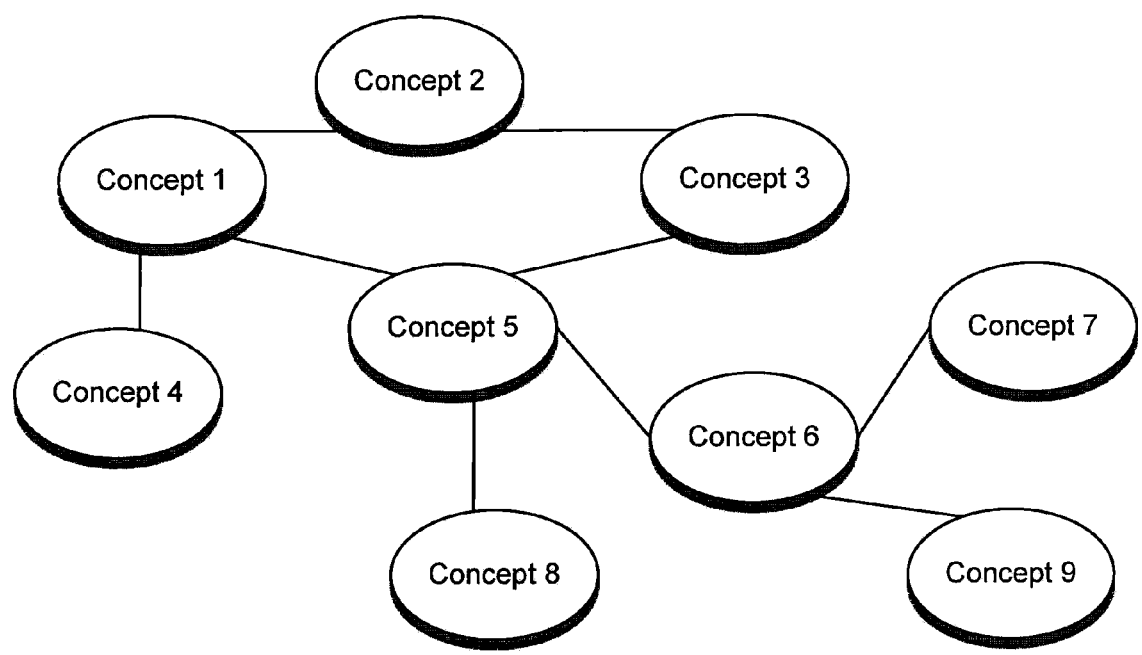
FIG. 3 is an example graph of a portion of a knowledge model.

As an example of a graph structure, FIG. 3, for example, depicts a graph for a particular knowledge model in which a number of concepts are interrelated. In FIG. 3, the distance between "Concept 1" and "Concept 2" is 1, while the distance between "Concept 1" and "Concept 3" is 2, being the shortest path through "Concept 2" or "Concept 5" and their respective relations, etc. The graph depicted in FIG. 3 may be represented in other forms rather than a 2-dimensional graph. For example, FIG. 4 shows a table in the relationships between the concepts of FIG. 3 are depicted in a tabular form. In the table of FIG. 4, the first column (C) lists the first concept in the relationship, the second column (C') lists the second concept in the relationship, the third column (paths) identifies the relationship between the first and second concept, as well as any other concepts that may be positioned between the first and second concept.

Figure 5A:
FIGS. 5A-5C depict a number of example concepts in the sports domain illustrating potential relationships between those concepts.
Figure 5B:
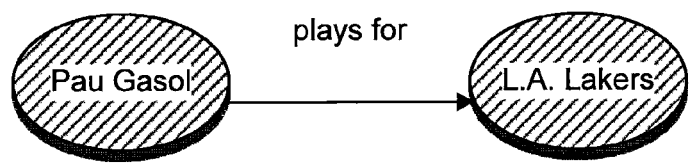
Figure 5C:
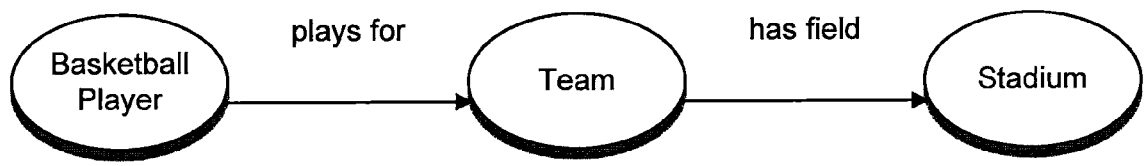

FIGS. 5A-5C depict a number of example concepts in the sports domain illustrating potential relationships between those concepts. In FIG. 5A, the concepts "basketball player" and "team" are related at a distance 1 (i.e., with no intervening concepts) through the "plays for" relationship. Accordingly, concrete instances of those concepts like "Pau Gasol" and the "Los Angeles Lakers" would also be at distance 1 (see, for example, FIG. 5B). Conversely, as shown in FIG. 5C, the concepts "basketball player" and "stadium" are related at a distance 2 (i.e., with a single intervening concept), through the relationship "plays for" with concept "team" and then the relationship "has field" with the concept "stadium".

In the present system and method, a search is triggered by a user providing a natural language query (e.g., using the client device 102 of FIG. 1) (though other means may be utilized to initiate a query). The natural language query is transformed into a structured query by extracting relevant terms (using NER and relationship extraction) and then combining those terms into a set of assertions (triples) that follows the ontological schema of the knowledge model, which are then used to query the knowledge base.

Figure 6:
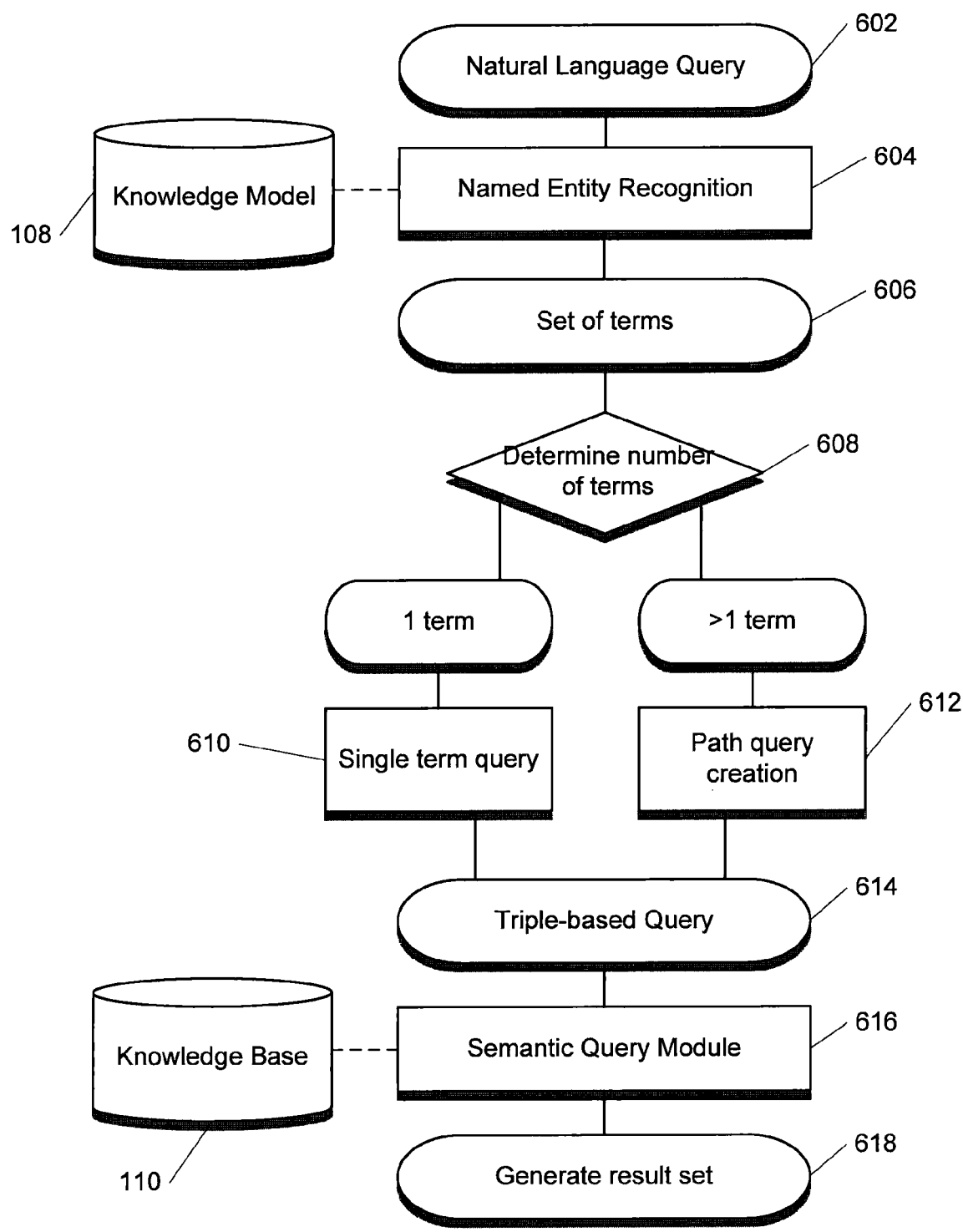
FIG. 6 is a flowchart illustrating a method for natural language querying of a database.

FIG. 6 is a flowchart illustrating the present method for natural language querying of a database. In step 602, a natural language query (i.e., a string of unstructured text) is received, for example, from the client device 102 of FIG. 1. In the present example, the natural language query is the string "Pau Gasol doing a dunk with the Spanish national team".

In step 604, Named Entity Recognition and Relationship extraction are performed on the string of text making up the natural language query. This analysis, as described above, may be performed based on the knowledge model of the system (i.e., the static set of classes, instances, and possible relationships defined for the particular domain), such as defined in knowledge model 108 of FIG. 1.

After performing Named Entity Recognition and Relationship extraction, in step 606 a set of terms will have been identified. The terms will generally include instances, concepts, or relationships that are present in the natural language query and that are also identified within the relevant knowledge model. In the present example, after analyzing the natural language query, the identified terms may include concepts (such as "basketball player"), instances (like "Pau Gasol") or even relationships ("scores"). In the example input text, three instances could be identified: "Pau Gasol" (instance of concept "basketball player"), "dunk" (instance of "action") and "Spanish national basketball team" (instance of "team").

In step 608, the number of identified terms is determined. Depending upon the number of terms found in the input natural language query, and their types, different mechanisms may be used to build the structured query.

If, in step 608 it is determined that only a single term was identified in the natural language query, a single-term query is created in step 610 in which the identified term is used both as a subject or a predicate in combination with all the different relationships allowed for the term's type. For example, if just an instance "Pau Gasol" of the type "basketball player" were found, that term would be combined with potential relationships from the knowledge model such as "plays for" and the abstract concept "team" to create the triple query ("Pau Gasol", "plays for", "?team"), etc. Note that in this case, the abstract concept "team" acts as a variable and is denoted as "?team" in the assertion.

If, however, in step 608 it is determined that more than 1 term was identified in the natural language query, in step 612 the various identified terms may be combined in different ways to create a suitable query that includes a plurality of triples or graphs. The terms are generally combined in pairs in order to generate a graph (a triple-based path query) that formally represents the knowledge in the natural language query. Depending on the number of terms identified in the natural language query, and their type (e.g., concept, instance, or relationship) the approach for constructing the queries may change. Accordingly, step 612 is described in more detail, below.

At the conclusion of either step 610 or 612 a query has been created that involves a set of assessments, which may be formally represented as $\{S_1 \cup S_2 \ldots \cup S_n\}$. The set of assessment may include a set of triples that combine the various terms (instances, concepts, and relationships) into triple statements, where some elements of each triple may be fixed and some variable. Accordingly, the triple statements may be represented by a (semantic) triple-based query, for example in SPARQL.

Figure 7:
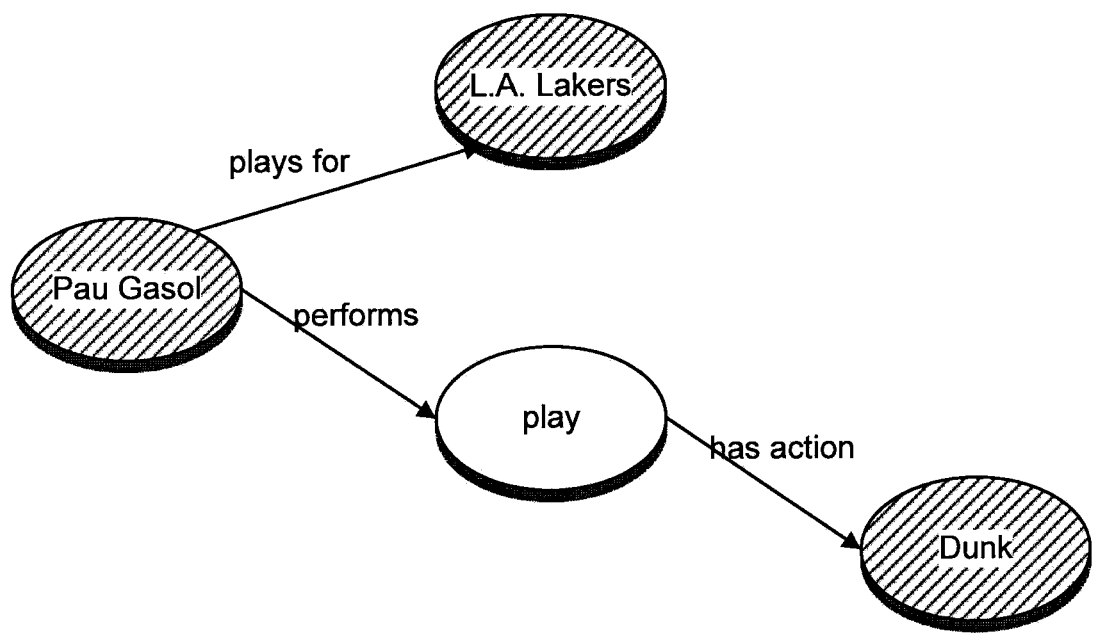
FIG. 7 is a graph depicting the concepts and relationship that may be identified in the natural language query "Pau Gasol doing a dunk with the Spanish national team".

In the present example, FIG. 7 is a graph depicting the concepts and relationship that may be identified in the natural language query "Pau Gasol doing a dunk with the Spanish national team". As shown in FIG. 7, three assertions could be part of the graph depicted in FIG. 7, namely: ("Pau Gasol", "plays for", "Los Angeles Lakers"), ("Pau Gasol", "performs", ?play) and (?play, "has action", "Dunk"). Note that the abstract concept "play" is represented as a variable (?play) in the set of assertions.

Returning to FIG. 6, in step 616 the semantic query is performed on the knowledge base (e.g., knowledge base 110 of FIG. 1) to retrieve items (or references to items) there from that fulfill the conditions defined in the query. As described above, the query can be arbitrarily represented as a combination of assertions $\{S_1 \cup S_2 \ldots \cup S_n\}$, where each assertion or statement $S_i$ is a triple in the form (s,p,o), where 's' the subject, 'p' the predicate, and 'o' the object.

Each of the three parts of each assertion (e.g., the subject, predicate and/or object) may act as a fixed term or as a variable, depending on the nature of the term (instance, concept) and the existence of the term within the set of found terms in the natural language query, etc. The query composed by the set of assertions is applied against the knowledge base, which will compare the assertions in the query with those used to annotate and index the assets contained within the knowledge base. Items in the knowledge base that are annotated or indexed with terms satisfying one or more of the triples contained within the query can then be returned in a result set.

In step 618, the result set is generated based upon the results of the search query executed against the knowledge base. Generally, the result set includes a set of multimedia assets (or other items identified as relevant in the knowledge base) that are relevant to the natural language query specified by the user, along with the individual concepts and instances and complete assertions associated to those assets. The result set may be formally represented as $\{A_1(S_a, S_b, \ldots S_z), A_2(S_{a'}, S_{b'}, \ldots S_{z'}), \ldots A_n(S_{a'''}, S_{b'''}, \ldots S_{z'''})\}$, where $A_i$ represents each of the assets that satisfy all the assertions, and $(S_a, S_b, \ldots S_z)$ represents the complete set of triple statements that are related to the given asset. Again, this formal representation is just one potential representation. For the result set, the list of items in the result set may be ordered so that assets where the assertions in the query have more weight (because those are the only statements associated with the asset, or because the same assertion is associated more than once with the same asset, e.g., for being associated from different parts along the length of a video) show up first in the results.

Figure 8:
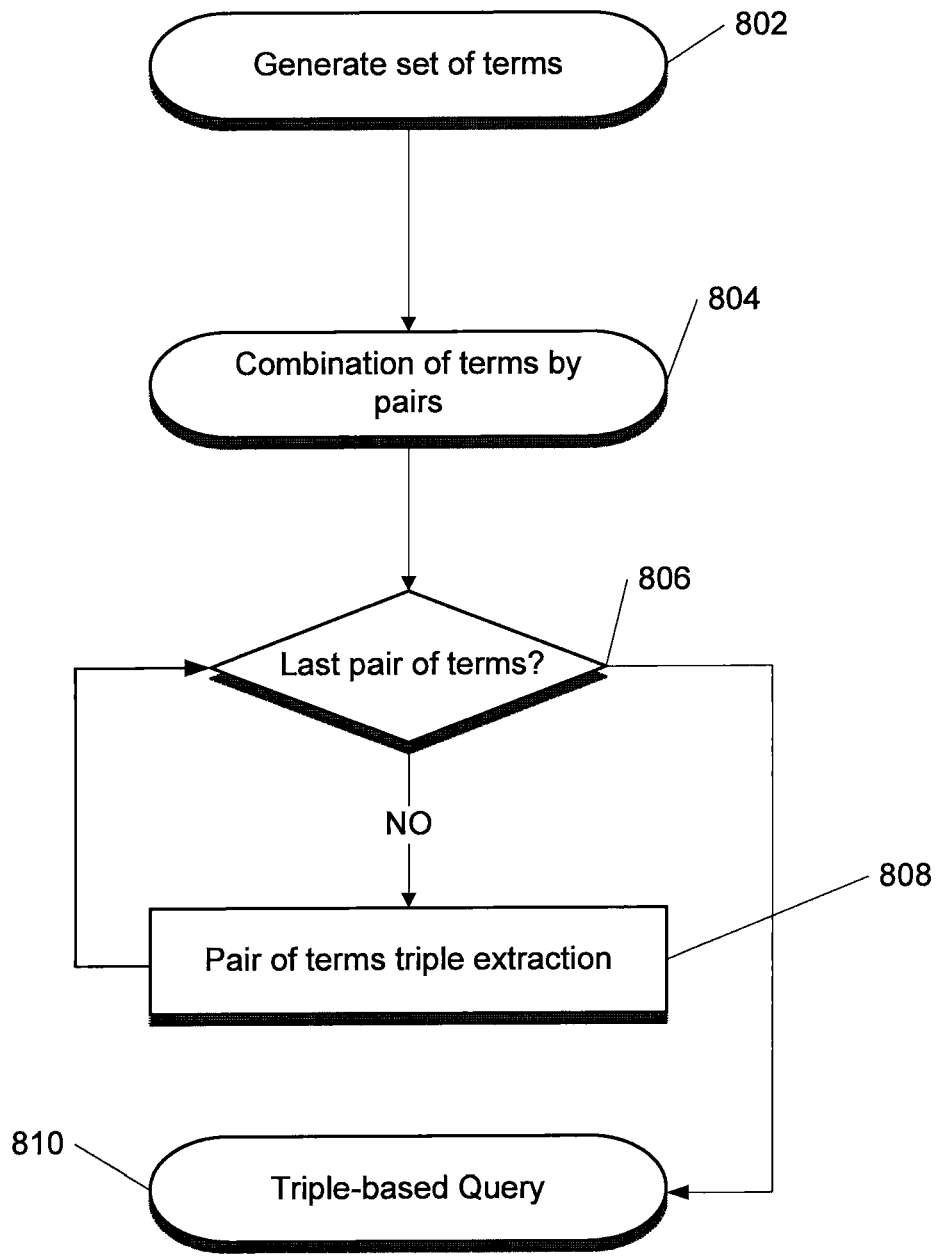
FIG. 8 is a flowchart illustrating steps of a method for performing the path query creation of the method of FIG. 6 when more than one term is identified in a natural language query.

FIG. 8 is a flowchart illustrating steps of a method for performing the path query creation (step 612) of the method of FIG. 6 when more than one term is identified in a natural language query. The method illustrated in FIG. 8 illustrates a potential approach when more than one term has been identified in a natural language query using NER and Relationship extraction techniques. Using the method of FIG. 8, a "path query" (i.e., a set of triple statements able to represent the query) may be created through the combination of terms (including concepts, instances and relationships) that appear in both the natural language query and the knowledge model.

In FIG. 8, the natural language query is processed in step 802 to generate a set of terms, as described above. In step 804, all possible pair combinations of the identified terms are determined. In the loop formed by steps 806 and 808, each potential pair of terms is iterated through and a triple is potentially created based upon each pair. Finally, in step 810, after all possible pair combinations have been iterated through, a triple-based query is generated.

Although the approach illustrated in FIG. 8 is comprehensive, it may be infeasible to use the approach if a large number of terms (and, therefore, a very large number of potential pair combinations) are identified. If the number of terms identified in step 802 is small enough (below an arbitrary threshold N of different terms found), then it may be feasible to generate a triple for every possible term combination. However, if the number of terms identified in step 802 is large (e.g., greater than the threshold N), not every combination may be considered, because the computational cost grows exponentially and the resulting query would be unmanageable.

Figure 9:
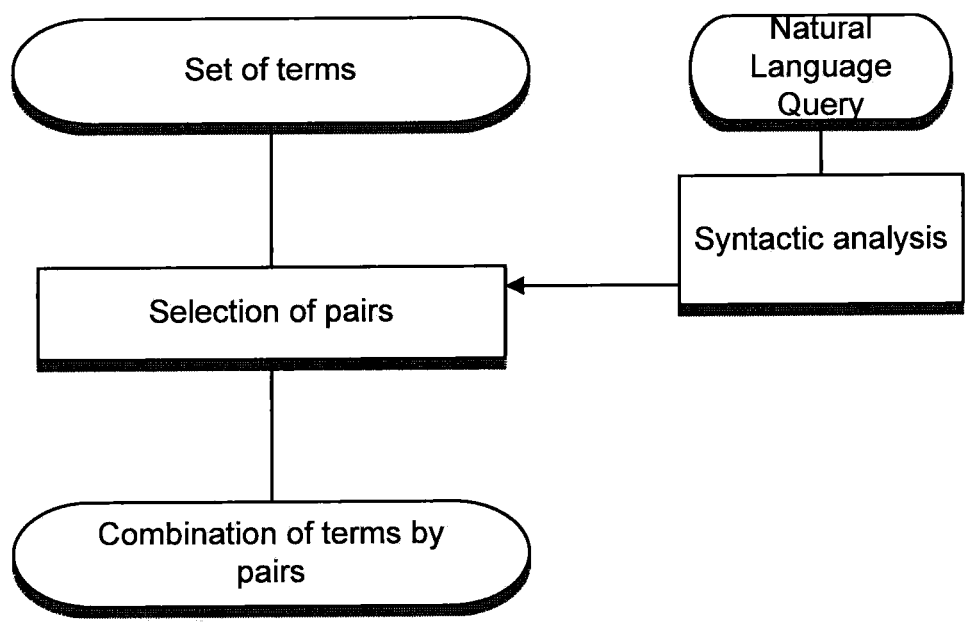
FIG. 9 is a flowchart illustrating the use of syntactic analysis to analyze a natural language query.

In the case of a large number of terms, one potential approach for minimizing the number of term pairs that must be analyzed would be to use syntactic analysis to obtain suitable combinations of terms from within the whole set, based on the parsing of the phrase and the syntactic tree created. FIG. 9, for example, is a flowchart illustrating the use of syntactic analysis to analyze a natural language query. The result of that syntactic analysis may then be used as an input into a step where pair pairs are selected from a set of terms.

This preliminary syntactical analysis could be useful in the case of relatively long natural language queries where many terms were recognized, as illustrated by the following example: "Pau Gasol doing a dunk playing with the Lakers against the Celtics"; using syntactical analysis it would be possible to discover which is the common subject ("Pau Gasol") to most of the assertions that can be created, and which kind of combinations predicate-object are more likely (in this case "doing"-"dunk", "play for"-"Lakers", "play against"-"Celtics"). In the next step, every suitable pair of terms is analyzed in order to extract triples (statements) able to relate the term pairs.

Figure 10:
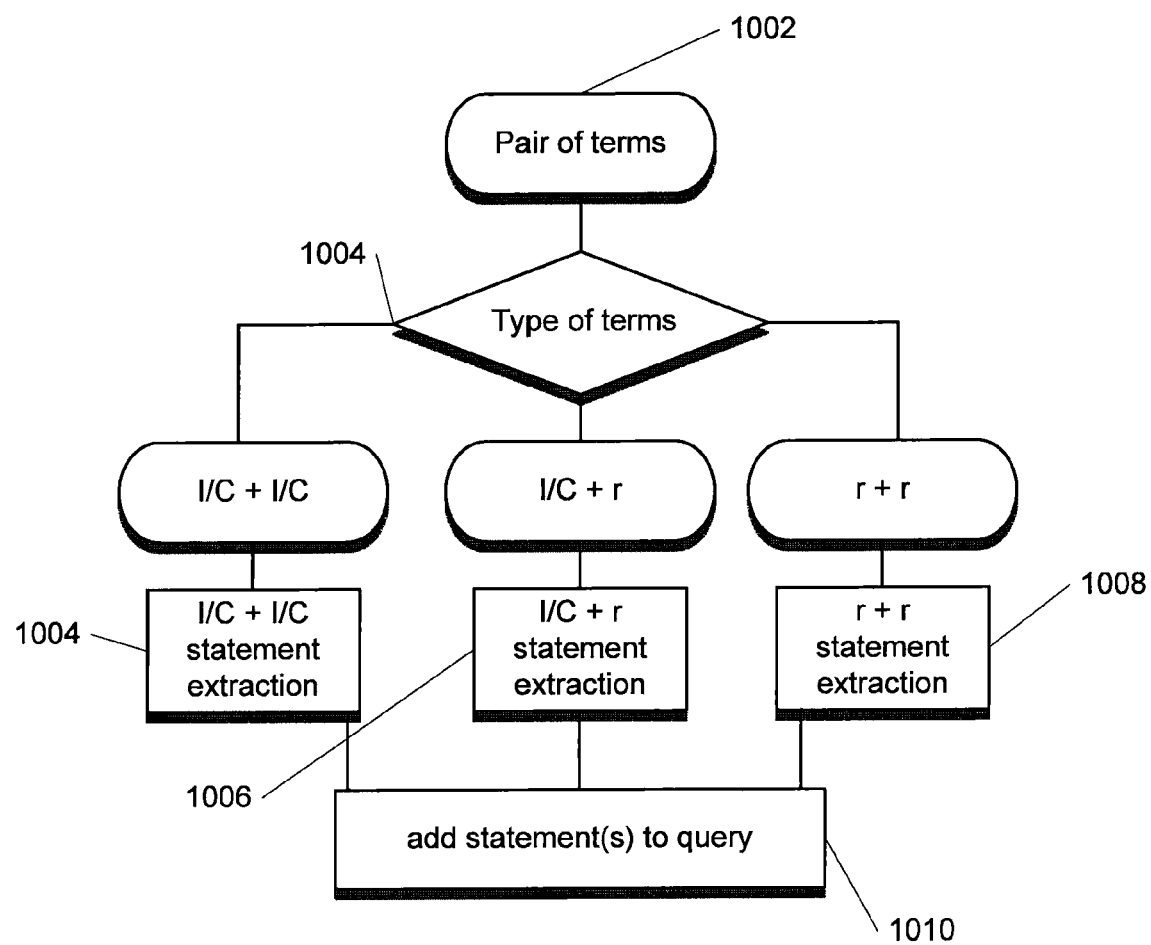
FIG. 10 is a flowchart illustrating an algorithm for generating triple statements for a set of input term pairs.

When creating the triples to relate the selected term pairs, a number of different algorithms may be used to generate the triples. In some cases, the algorithms for creating the triples are different depending upon the types of terms being combined (for example, whether the terms in the pairing are instances, concepts, or relationships). FIG. 10 is a flowchart illustrating an algorithm for generating triple statements for a set of input term pairs. Referring to FIG. 10, in step 1002 a natural language query is analyzed to identify a set of terms (in some cases additional syntactic analysis of the natural language query will allow for a determination of a subset of the identified terms that are utilized). A number of different potential pairs of terms are then generated.

Figure 11:
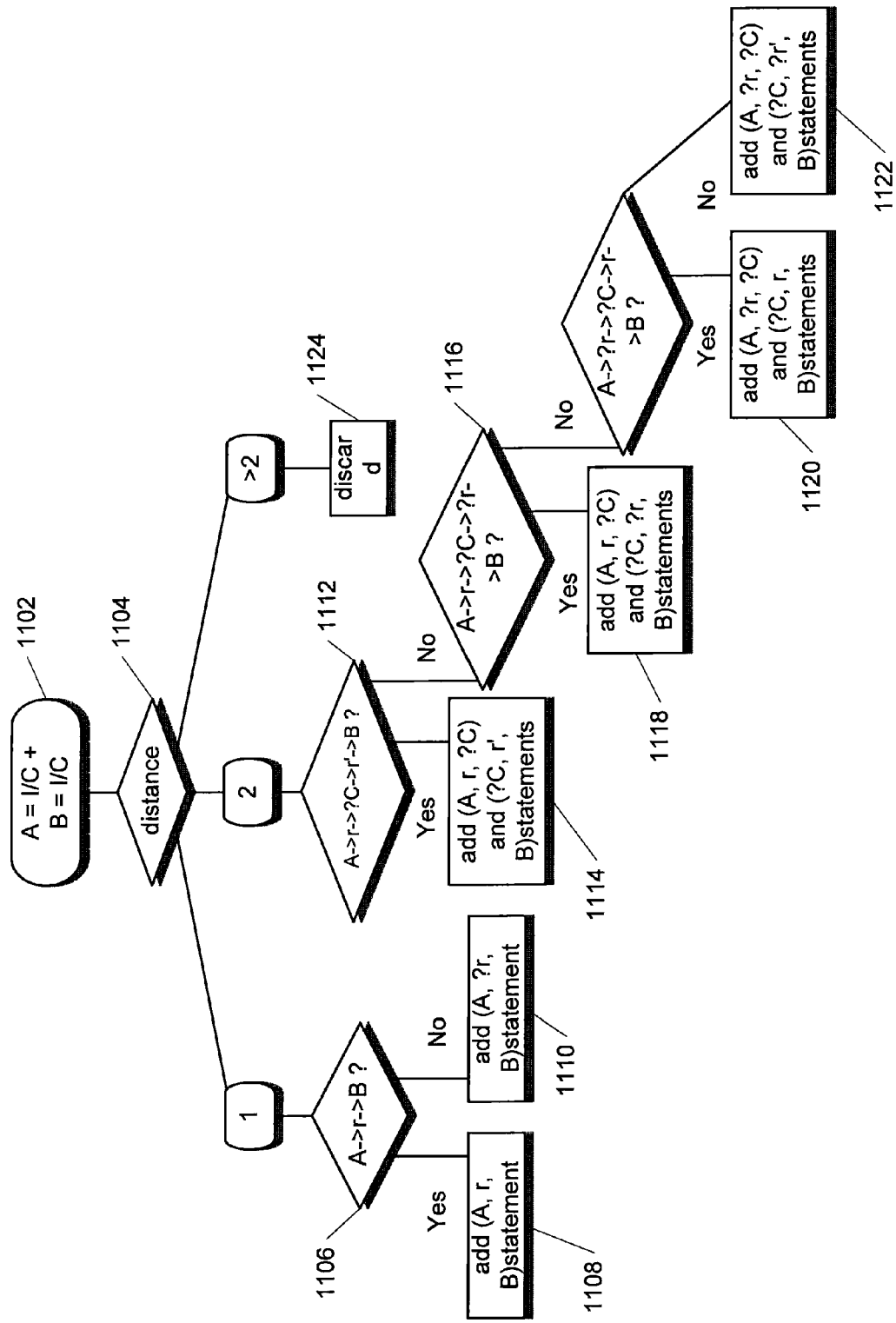
FIG. 11 is a flowchart illustrating a method for creating a triple statement for a combination of two terms where each term is an instance or a concept (I/C).
Figure 12:
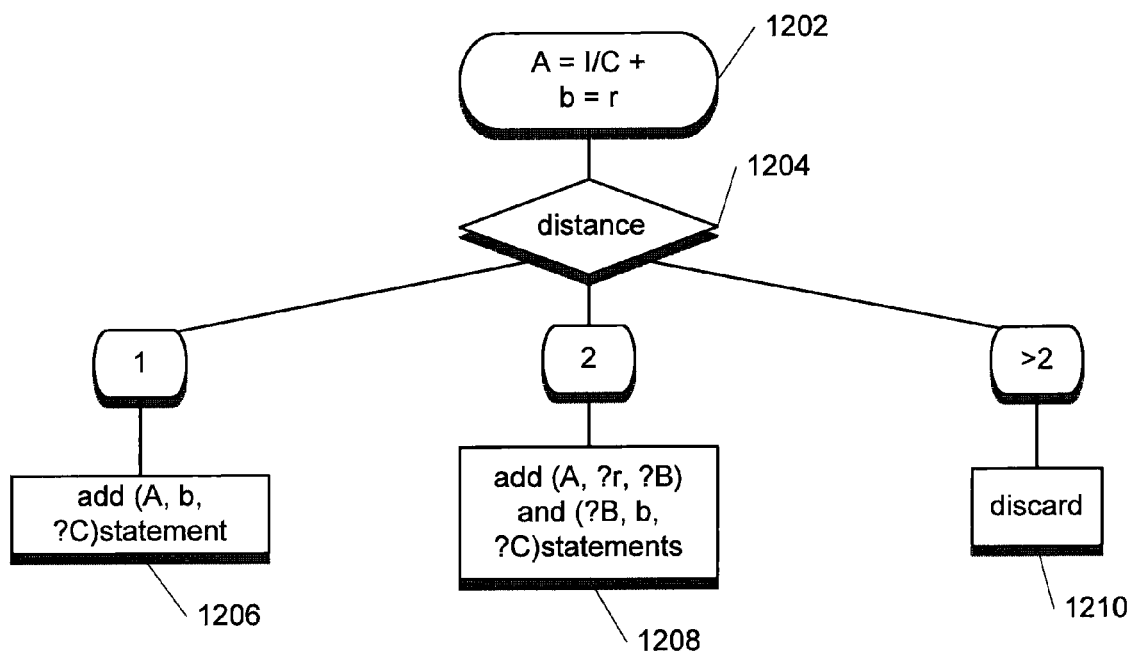
FIG. 12 is a flowchart illustrating a method for creating a triple statement for a combination of two terms where one of the terms (term A) is an instance or a concept (I/C), and the other term (term b) is a relationship (r).
Figure 13:
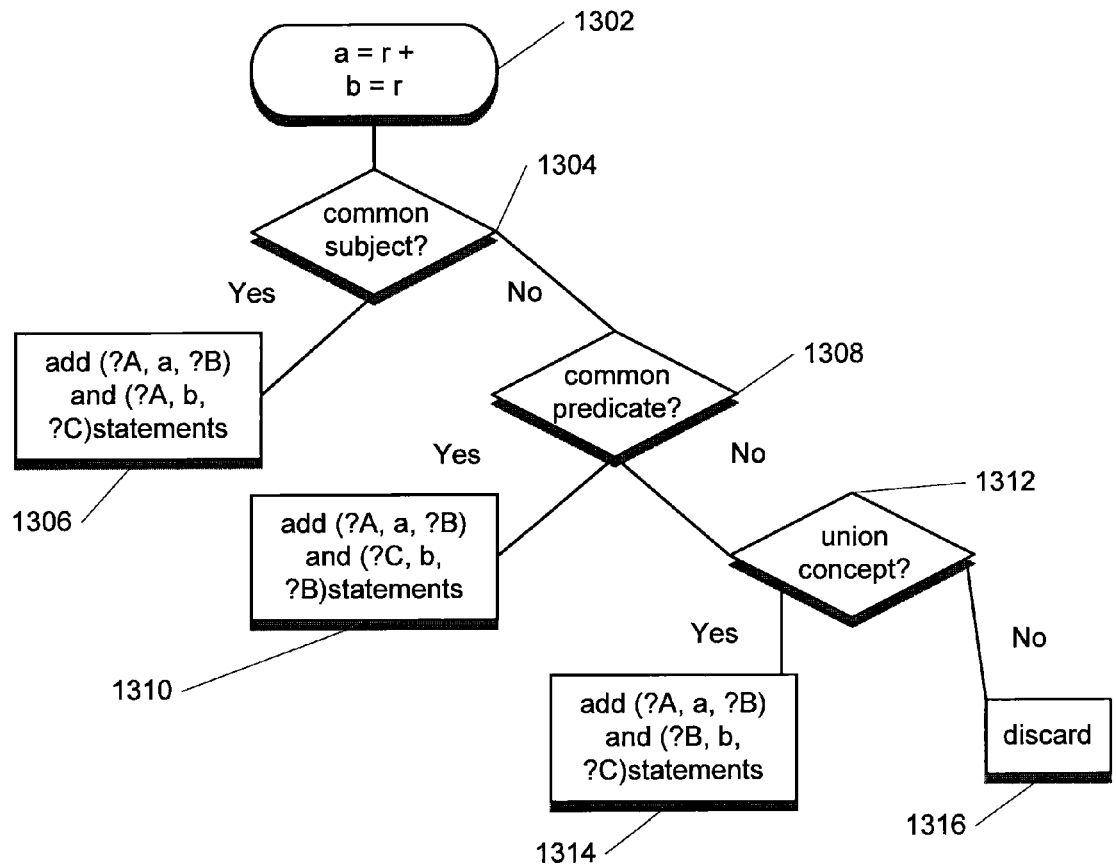
FIG. 13 is a flowchart illustrating a method for creating a triple statement for a combination of two terms (term a and term b) where each term is a relationship.

In step 1004, for each candidate pair of terms, each term in the pairing is analyzed to determine the type of term (using, for example, the knowledge model). If the term pair includes two terms that are both instances or concepts (I/C), then a triple statement is generated using I/C+I/C statement extraction as illustrated in FIG. 11. If, however, the term pair includes one I/C term and a second term that described a relationship (r), then a triple statement is generated using I/C+r statement extraction as illustrated in FIG. 12. If, however, the term pair includes two terms that each describe a relationship (two r terms), then a triple statement is generated using r+r statement extraction as illustrated in FIG. 13.

Once all combinations of terms have been processed, each triple statement is added to a final query in step 1010, which can then be executed against an appropriate knowledge base.

FIG. 11 is a flowchart illustrating a method for creating a triple statement for a combination of two terms where each term is an instance or a concept (I/C). In step 1102, each term in the term pair (terms A and B) is analyzed to determine whether it is an instance or a concept (as opposed to a relationship). Having made that determination, in step 1104, the relevant knowledge model is consulted to determine a distance between term A and term B (see, for example, the table of FIG. 4). If the distance between the terms is 1, in step 1106 the entire set of terms identified within the input natural language query is consulted to determine whether a term is present that defines the relationship between terms A and B. If so, in step 1108, a statement in the form of (A, r, B) is added to the set of statements for the query, where "A" is first instance or concept term, "B" is the second instance or concept term, and "r" is the relationship term that was identified in the set of input terms. Alternatively, if there is not a relationship term in the set of found terms able to satisfy the triple, in step 1110, a statement is added to the query in the form of (A, ?r, B), where "?r" denotes that the relationship portion of the triple is a variable (e.g., the relationship is not known or fixed). In both cases and for A and B, if the terms are instances, they are included into the statement as fixed terms, while if they are concepts, they are included as variables of the corresponding concept (class).

An example of this scenario would be where the two terms are: A="Pau Gasol" (instance of "player") and B="Boston Celtics" (instance of team). If a valid relationship such as "play against" was included in the original query and set of identified terms, the triple statement that would be added to the query would be ("Pau Gasol", "plays against", "Boston Celtics"); however, if no valid relationship was available in the set of terms, the statement would have a variable in the relationship part: ("Pau Gasol", ?r, "Boston Celtics"), potentially matching different predicates like "plays for", "plays against", etc.

If, however, the distance between the terms is 2 (that is, the two input terms (A and B) are linked by a third term (C), in step 1112 a determination is made as to whether two relationship terms (r and r') are included in the identified terms of the natural language query that would link the two input terms A and B through the third term C. If so, two different statements are added to the resulting set in step 1114: (A, r, ?C) and (?C, r', B), where "?C" is a variable of the linking concept in the path, and "A", "B", "r" and "r'" the kind of terms already explained.

If no suitable pair of relationship terms is found within the set of terms, in step 1116 a determination is made as to whether there is a relationship "r" in the input set of terms derived from the natural language query that completes some part of the path between the two input terms, either directly connected with the first term A, or with the second term B. If a relationship is identified that is directly connected with the first term A, in step 1118 two statements (A, r, ?C) and (?C, ?r, B) are added. If, instead, a relationship is identified that is directly connected with the second term B, in step 1120 the two statements added to the query would be (A, ?r, ?C) and (?C, r, B), where in both cases the term "r" is the found relationship term, and "?r'" is a variable relationship term.

Finally, if no valid relationship is found within the set of terms that is connected to either the first or second term, in step 1222 the two statements to be added to the query consist of (A, ?r, ?C) and (?C, ?r', B), and include two variables for the relationships, namely "?r" and "?r'".

In the present implementation, if the distance between the two input terms is greater than 2, then in step 1124 the two terms are discarded and a new term pair is selected for analysis. In some instances, this may be a desired behavior, not only because of the complexity that involves regarding the path query creation via single statements, but also for the unsuitability of such a path in terms of capturing the important information within the natural language query. In any case, some embodiments of the present system may consider additional algorithms in this particular scenario.

FIG. 12 is a flowchart illustrating a method for creating a triple statement for a combination of two terms where one of the terms (term A) is an instance or a concept (I/C), and the other term (term b) is a relationship (r). In step 1202, both terms are first analyzed to determine that they both refer to either an instance/concept or relationship. Having determined that term A relates to an instance or concept and term b refers to a relationship, in step 1204, the relevant knowledge model is consulted to determine a distance between the two terms (see, for example, the table of FIG. 4). In this case, the calculation of the total distance could be done taking into consideration the whole path from the instance/concept term until the ending concept that can be reached through the use of the relationship term.

If the distance between the two input terms is 1, in step 1206 the statement (A, b, ?C) is added to the query, where "A" is the instance or concept term in the pair, "b" is the relationship term, and the ending node "?C" is a variable for the concept that satisfies the domain schema.

For example, if the instance/concept term is "Pau Gasol" and the relationship term is "play against", the statement to be added to the query would be ("Pau Gasol", "play against", ?C), where ?C is a variable that would match any instance of the concept "team".

If the distance between the input terms is 2, that indicates that the relationship is applied to a concept that is at distance 1 of the starting node. In this case, in step 1208 two different statements are added to the query: (A, ?r, ?B) and (?B, b, ?C), where "?r" is a variable for the relationship in the first triple, and "?B" and "?C" are also variables of concepts.

Finally, if the distance between the terms is greater than 2, in one implementation, the term pair is discarded in step 1210, though other implementations may consider further techniques to include statements based on this type of combination of terms.

FIG. 13 is a flowchart illustrating a method for creating a triple statement for a combination of two terms (term a and term b) where each term is a relationship. In step 1302, both terms are first analyzed to determine that they both refer a relationship. Having made that determination, in step 1304 the two terms are analyzed to determine whether there is a concept that, according to the relevant knowledge model, could be the subject of both relationships "a" and "b". If that was the case, in step 1306 two statements (?A, a, ?B) and (?A, b, ?C) could be added to the query, where "?A" is a variable for the common concept between the two relationships, and "?B" and "?C" are the respective predicates, which in the added statements act also as variables. If there was not a concept able to act as common subject, in step 1308 a determination is made as to whether there exists a concept that may act as a common predicate for the two relationship terms. If so, in step 1310 the two different statements to be added query are (?A, a, ?B) and (?C, b, ?B), where "?B" is the common predicate.

Finally, if no common predicate was found, in step 1312 a determination is made as to whether there is a concept that joins both relationship terms, acting as predicate with respect to one of the terms, and as subject to the other term. If so, in step 1314, the two statements to be added to the query would be (?A, a, ?B) and (?B, b, ?C), with "?B" acting as the variable for the joining concept, and "?A" and "?C" as the other variables for the starting and ending concepts. An example of this r+r term combination would be a="plays for" and b="has field", where the concept "team" is able to join both. In this case, the two statements (?A, "plays for", ?B) and (?B, "has field", ?C) would include three variables ?A, ?B and ?C that would represent, respectively, an instance of the concepts "player", "team", and "field".

If no concept was found as able to link both relationship terms, the term pair is discarded in step 1316, though other implementations may consider further techniques to include statements based on this type of combination of terms.

In various other implementations of the method depicted in FIG. 13, the distance between the two relationship terms could be determined and, when the distance is greater than 2, the terms could be discarded automatically.

Having analyzed the terms of a particular natural language query and generated triple statement for each pair combination using the methods of FIGS. 11, 12, and 13, the triple statements are combined together and executed against the knowledge base. The triple statements may be joined in a formal query through the use of well-known query languages for semantic graph models, such as SPARQL, or other RDF query languages. Such query languages allow users build queries through the use of triple patterns including both constants and variables, and are therefore suitable for the combination of generated triple statements in standard formats that cater for logical conjunctions in accordance with the present disclosure.

As a non-limiting example, the steps described above (and all methods described herein) may be performed by any central processing unit (CPU) or processor in a computer or computing system, such as a microprocessor running on a server computer, and executing instructions stored (perhaps as applications, scripts, apps, and/or other software) in computer-readable media accessible to the CPU or processor, such as a hard drive on a server computer, which may be communicatively coupled to a network (including the Internet). Such software may include server-side software, client-side software, browser-implemented software (e.g., a browser plugin), and other software configurations.

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. An information retrieval system, comprising:
   a computer server configured to communicate with a client computer via a communications network;
   a knowledge model database stored within a computer-readable media of the computer server and configured to store a knowledge model for a knowledge domain, the knowledge model defining a plurality of entities and relationships between one or more of the plurality of entities, the plurality of entities including a plurality of concepts and instances;
   a knowledge base stored within the computer-readable media of the computer server and identifying a plurality of items, each of the plurality of items being associated with at least one annotation identifying at least one of the plurality of entities in the knowledge model; and
   a query processing server executed by a processor of the computer server and configured to:
      receive, from the client computer, a natural language query using the computer network,
      analyze the natural language query to identify a plurality of terms,
      determine a type of each term in a pair of terms in the plurality of terms using the knowledge model,
      determine a distance between each term in the pair of terms in the knowledge model, and
      when a first term in the pair of terms has a type of instance or concept and the second term in the pair of terms has a type of relationship:
         when a distance between each term in the pair of terms is 1, constructing, without a user input, a query statement including a first triple statement containing the first term, the second term and a first variable configured to match one or more of the plurality of concepts and instances in the knowledge model database, and
         when the distance between each term in the pair of terms is 2, constructing, without a user input, the query statement including a second triple statement containing the first term, a second variable configured to match one or more of the relationships in the knowledge model database, and a third variable configured to match one or more of the plurality of concepts and instances in the knowledge model database and a third triple statement including the third variable, the second term, and a fourth variable configured to match one or more of the plurality of concepts and instances in the knowledge model database,
      execute the query statement against the knowledge base to generate a set of results, and
      transmit, to the client computer, the set of results.

2. The system of claim 1, wherein the query processing server is configured to:
   analyze the natural language query using named entity recognition.

3. The system of claim 1, wherein the knowledge model database is configured as a triplestore.

4. The system of claim 1, wherein the query processing server is configured to, when the distance between each term in the pair of terms is two or greater, discard the term pair.

5. A method for information retrieval, comprising:
   receiving, from a client computer, a natural language query using a computer network;
   analyzing the natural language query to identify a plurality of terms;
   determining a type of each term in a pair of terms in the plurality of terms using a knowledge model, the knowledge model defining a plurality of entities and relationships between one or more of the plurality of entities for a knowledge domain, the plurality of entities including a plurality of concepts and instances; and
   when a first term in the pair of terms has a type of relationship and the second term in the pair of terms has a type of relationship:
      constructing, without a user input, a query statement by:
         determining a distance between each term in the pair of terms in the knowledge model,
         when a first term in the pair of terms has a type of instance or concept and the second term in the pair of terms has a type of relationship:
            when a distance between each term in the pair of terms is 1, constructing, without a user input, the query statement including a first triple statement containing the first term, the second term and a first variable configured to match one or more of the plurality of concepts and instances in the knowledge model database, and
            when the distance between each term in the pair of terms is 2, constructing, without a user input, the query statement including a second triple statement containing the first term, a second variable configured to match one or more of the relationships in the knowledge model database, and a third variable configured to match one or more of the plurality of concepts and instances in the knowledge model database and a third triple statement including the third variable, the second term, and a fourth variable configured to match one or more of the plurality of concepts and instances in the knowledge model database;
      executing the query statement against a knowledge base to generate a set of results, the knowledge base identifying a plurality of items, each of the plurality of items being associated with at least one annotation identifying at one of the entities in the knowledge model, and
      transmitting, to the client computer, the set of results.

6. The method of claim 5, including analyzing the natural language query using named entity recognition.

7. The method of claim 5, wherein the knowledge model database is configured as a triplestore.

8. The method of claim 5, including, when the distance between each term in the pair of terms is two or greater, discarding the term pair.

9. A non-transitory computer-readable medium containing instructions that, when executed by a processor, cause the processor to perform the steps of:

receiving, from a client computer, a natural language query using a computer network;

analyzing the natural language query to identify a plurality of terms;

determining a type of each term in a pair of terms in the plurality of terms using a knowledge model, the knowledge model defining a plurality of entities and relationships between one or more of the plurality of entities for a knowledge domain;

determining a distance between each term in the pair of terms in the knowledge model, constructing a triple statement using the type of each term in the pair of terms, by:

determining a distance between each term in the pair of terms in the knowledge model, when a first term in the pair of terms has a type of instance or concept and the second term in the pair of terms has a type of relationship:

when a distance between each term in the pair of terms is 1, constructing, without a user input, the query statement including a first triple statement containing the first term, the second term and a first variable configured to match one or more of the plurality of concepts and instances in the knowledge model database, and when the distance between each term in the pair of terms is 2, constructing, without a user input, the query statement including a second triple statement containing the first term, a second variable configured to match one or more of the relationships in the knowledge model database, and a third variable configured to match one or more of the plurality of concepts and instances in the knowledge model database and a third triple statement including the third variable, the second term, and a fourth variable configured to match one or more of the plurality of concepts and instances in the knowledge model database executing a query against a knowledge base using the triple statement to generate a set of results, the knowledge base identifying a plurality of items, each of the plurality of items being associated with at least one annotation identifying at one of the entities in the knowledge model; and transmitting, to the client computer, the set of results.

10. The medium of claim 9, including instructions that, when executed by a processor, cause the processor to perform the steps of:

analyzing the natural language query using named entity recognition.

11. The medium of claim 9, including instructions that, when executed by a processor, cause the processor to perform the steps of, when the distance between each term in the pair of terms is two or greater, discarding the term pair.

12. The medium of claim 9, including instructions that, when executed by a processor, cause the processor to perform the steps of, when the type of each term in the pair of terms is the instance type or the concept type, analyzing each of the plurality of the terms to identify a linking term having a type that is the relationship type, where the linking term links the pair of terms in the knowledge model.

\* \* \* \* \*